United States Patent
Masaoka

(10) Patent No.: US 9,755,699 B2
(45) Date of Patent: Sep. 5, 2017

(54) WIRELESS POWER TRANSFER SYSTEM THAT PERFORMS POWER TRANSFER FROM DETERMINED POWER TRANSMISSION DEVICE TO POWER RECEIVING DEVICE, POWER TRANSMISSION DEVICE, POWER RECEIVING DEVICE, AND CONTROL METHOD OF WIRELESS POWER TRANSFER SYSTEM

(75) Inventor: Shinya Masaoka, Hiroshima (JP)

(73) Assignee: THE CHUGOKU ELECTRIC POWER CO., INC., Hiroshima (JP)

( * ) Notice: Subject to any disclaimer, the term of this patent is extended or adjusted under 35 U.S.C. 154(b) by 487 days.

(21) Appl. No.: 14/378,541

(22) PCT Filed: Feb. 29, 2012

(86) PCT No.: PCT/JP2012/055104
§ 371 (c)(1),
(2), (4) Date: Aug. 13, 2014

(87) PCT Pub. No.: WO2013/128597
PCT Pub. Date: Sep. 6, 2013

(65) Prior Publication Data
US 2015/0028688 A1    Jan. 29, 2015

(51) Int. Cl.
*H04B 5/00* (2006.01)
*H02J 17/00* (2006.01)
*H02J 5/00* (2016.01)

(52) U.S. Cl.
CPC ............ *H04B 5/0037* (2013.01); *H02J 5/005* (2013.01); *H02J 17/00* (2013.01); *H04B 5/00* (2013.01)

(58) Field of Classification Search
CPC ....................................................... H04B 5/00
(Continued)

(56) References Cited

U.S. PATENT DOCUMENTS 9,478,991 B2 * 10/2016 Weissentern ............ H02J 5/005
9,520,725 B2 * 12/2016 Masaoka .................. H02J 17/00
(Continued)

FOREIGN PATENT DOCUMENTS

CN       103828188 A      5/2014
EP       2 256 895 A1    12/2010
(Continued)

OTHER PUBLICATIONS

International Search Report issued in PCT/JP2012/055104 mailed on May 22, 2012 (2 pages).
(Continued)

*Primary Examiner* — Adi Amrany
(74) *Attorney, Agent, or Firm* — Osha Liang LLP

(57) ABSTRACT

A wireless power transfer system includes a power receiving device and a plurality of power transmission devices that perform power transfer to the power receiving device. The power receiving device transmits request-power to the power transmission device, the request-power being power the power receiving device requests to be supplied with. The power transmission device, when receiving the request-power from the power receiving device, generates determination reference information based on the received request-power, the determination reference information being information to be used as a determination reference when the power receiving device selects the power transmission device, and transmits the generated determination reference information to the power receiving device. The power receiving device receives the determination reference information, selects the power transmission device from which the power receiving device is to receive power supply, and transmits a power transmission start request to the selected power transmission device.

4 Claims, 10 Drawing Sheets

(58) Field of Classification Search
USPC .......................................................... 307/104
See application file for complete search history.

(56) References Cited

U.S. PATENT DOCUMENTS

| | | | | |
|---|---|---|---|---|
| 2009/0019165 | A1* | 1/2009 | Li | H04L 1/0002 709/227 |
| 2009/0264069 | A1 | 10/2009 | Yamasuge | |
| 2010/0201204 | A1* | 8/2010 | Sakoda | H02J 5/005 307/104 |
| 2010/0244580 | A1* | 9/2010 | Uchida | H02J 5/005 307/104 |
| 2011/0270462 | A1* | 11/2011 | Amano | H02J 5/005 700/297 |
| 2013/0063082 | A1* | 3/2013 | Lee | H02J 7/025 320/108 |
| 2013/0069585 | A1* | 3/2013 | Kamata | H02J 5/005 320/108 |
| 2013/0154558 | A1* | 6/2013 | Lee | H04B 5/0037 320/108 |
| 2013/0181665 | A1* | 7/2013 | Lee | H02J 7/007 320/108 |
| 2013/0270925 | A1* | 10/2013 | Tanaka | H02J 7/025 307/104 |
| 2014/0009110 | A1* | 1/2014 | Lee | H02J 7/025 320/108 |
| 2014/0062395 | A1* | 3/2014 | Kwon | H02J 50/60 320/108 |
| 2014/0145514 | A1* | 5/2014 | Konno | B60L 11/182 307/104 |
| 2014/0159508 | A1* | 6/2014 | Sankar | H02J 17/00 307/149 |
| 2014/0239734 | A1* | 8/2014 | Masaoka | H04B 5/0037 307/104 |
| 2014/0327323 | A1* | 11/2014 | Masaoka | H02J 17/00 307/104 |
| 2014/0354052 | A1* | 12/2014 | Masaoka | H02J 17/00 307/31 |
| 2015/0229134 | A1* | 8/2015 | Masaoka | H02J 17/00 307/104 |
| 2015/0255990 | A1* | 9/2015 | Masaoka | H02J 7/025 307/104 |

FOREIGN PATENT DOCUMENTS

| | | |
|---|---|---|
| JP | 2004-184078 A | 7/2004 |
| JP | 2005-351877 A | 12/2005 |
| JP | 2005-351878 A | 12/2005 |
| JP | 2006-023261 A | 1/2006 |
| JP | 2006-081249 A | 3/2006 |
| JP | 2008-092704 A | 4/2008 |
| JP | 2009-261157 A | 11/2009 |
| JP | 2011-188733 A | 9/2011 |
| JP | 2011-234565 A | 11/2011 |
| JP | 2011-244684 A | 12/2011 |
| WO | 2008/050292 A2 | 5/2008 |
| WO | 2011/122348 A1 | 10/2011 |
| WO | 2011-128969 A1 | 10/2011 |

OTHER PUBLICATIONS

Written Opinion of the International Searching Authority issued in PCT/JP2012/055104 mailed on May 22, 2012 (4 pages).
Japanese Office Action in corresponding Application No. 2012-528983 mailed on Aug. 7, 2012 (3 pages).
International Preliminary Report on Patentability in corresponding PCT Application No. PCT/JP2012/055104, mailed Sep. 12, 2014 (2 pages).
English translation of Written Opinion of the International Searching Authority issued in PCT/JP2012/055104 mailed on May 22, 2012 (5 pages).
Office Action issued in corresponding Korean Application No. 10-2014-7018222 dated Apr. 14, 2016, and English translation thereof (6 pages).
Extended European Search Report in counterpart European Application No. 12 87 0174.5 mailed Dec. 4, 2015 (6 pages).
Office Action in counterpart Chinese Patent Application No. 201280070745.4 issued on Jan. 27, 2016 (15 pages).

* cited by examiner

REQUEST POWER INFORMATION

DETERMINATION REFERENCE INFORMATION

| POWER TRANSMISSION DEVICE ID | REQUEST POWER DETERMINATION REFERENCE | TRANSMISSION EFFICIENCY DETERMINATION REFERENCE | MOVEMENT HISTORY DETERMINATION REFERENCE | CIRCUIT UTILIZATION RATE DETERMINATION REFERENCE |
|---|---|---|---|---|
| 10(1) | ON | ON | OFF | ON |

DETERMINATION REFERENCE
INFORMATION MANAGEMENT TABLE

| POWER TRANSMISSION DEVICE ID | REQUEST POWER DETERMINATION REFERENCE | TRANSMISSION EFFICIENCY DETERMINATION REFERENCE | MOVEMENT HISTORY DETERMINATION REFERENCE | CIRCUIT UTILIZATION RATE DETERMINATION REFERENCE |
|---|---|---|---|---|
| 10(1) | ON | ON | OFF | ON |
| 10(2) | OFF | OFF | ON | ON |
| 10(3) | ON | ON | ON | OFF |
| ⋮ | ⋮ | ⋮ | ⋮ | ⋮ |

FIG. 15

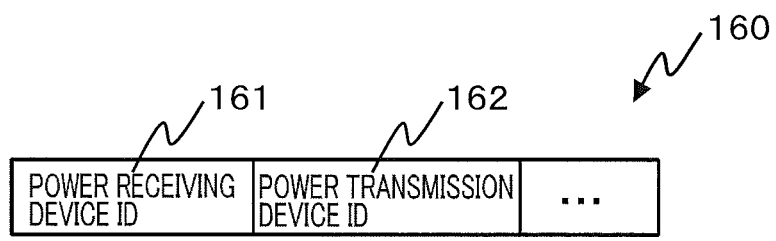

POWER TRANSMISSION START REQUEST

| POWER RECEIVING DEVICE ID | POWER TRANSMISSION DEVICE ID | ... |

FIG. 16

WIRELESS POWER TRANSFER SYSTEM THAT PERFORMS POWER TRANSFER FROM DETERMINED POWER TRANSMISSION DEVICE TO POWER RECEIVING DEVICE, POWER TRANSMISSION DEVICE, POWER RECEIVING DEVICE, AND CONTROL METHOD OF WIRELESS POWER TRANSFER SYSTEM

TECHNICAL FIELD

The present invention generally relates to a wireless power transfer system, a power transmission device, a power receiving device and a control method of the wireless power transfer system, and more particularly to a technique to select the power transmission device appropriately and perform power transfer to the power receiving device.

BACKGROUND ART

Patent Literature 1 describes a wireless power receiving device including a receiving coil for receiving a power signal that includes any of an electric field, a magnetic field, and an electromagnetic field transmitted from a wireless power transmission device, a bridge circuit that is connected to the receiving coil and is configured so that each of whose internal switches can be switched to on or off state with a first state or a second state, a receiver to receive a control signal that includes at least one of frequency information and phase information, which are transmitted from the power transmission device for switching to the first state or the second state, a control section in which the bridge circuit is switched to the first state or the second state in accordance with the control signal.

Patent Literature 2 describes a wireless power transfer system including a power-receiving side antenna mounted on an apparatus for utilizing electrical energy as a power source, and an AC power driver that supplies AC power to a power-transmission side antenna so as to coincide with a resonance frequency from the power-transmission side antenna to the power-receiving side antenna, in which power supply is started in a case where it is detected that the apparatus described above has entered into a power transferable area of the power-transmission side antenna.

CITATION LIST

Patent Literature

[PTL 1]
Japanese Patent Application Laid-open Publication No. 2011-244684
[PTL 2]
Japanese Patent Application Laid-open Publication No. 2011-234565

Recently, a technology related to wireless power transfer that performs power supply by wireless power transmission attracts attention. Also in the Ministry of Internal Affairs and Communications, a discussion on a wireless electrical appliance is underway, which is targeted for completion from 2015 to 2020. Therefore, it is conceived that electrical appliances (power receiving devices) capable of wireless power transfer will spread rapidly in the future, and power transmission devices for performing power transfer to these power receiving devices will be provided in various places such as a home and a company.

Here, in a case where a plurality of power transmission devices are arranged adjacent to one another for the purpose of handover or the like, it is assumed that there is a case in which the areas where each of the adjacent power transmission devices can perform power transfer (hereinafter, referred to as a power transmission area) are overlapped near the border or the like of the power transmission area. Therefore, in a case where the power receiving device exists in the overlapped power transmission area, a mechanism for appropriately selecting the power transmission device in accordance with the conditions of the power receiving device and the power transmission device so as to perform power transfer to the power receiving device is needed.

SUMMARY OF THE INVENTION

One or more embodiments of the present invention provide a wireless power transfer system, a power transmission device, a power receiving device, and a control method of the wireless power transfer system, which are capable of appropriately selecting the power transmission device so that power supply is performed to the power receiving device.

In one aspect, one or more embodiments of the present invention may be a wireless power transfer system comprising:
a power receiving device; and
a plurality of power transmission devices that perform power transfer to the power receiving device, wherein
the power receiving device transmits request-power to the power transmission device, the request-power being power the power receiving device requests to be supplied with,
the power transmission device
when receiving the request-power from the power receiving device, generates determination reference information based on the received request-power, the determination reference information being information to be used as a determination reference when the power receiving device selects the power transmission device, and
transmits the generated determination reference information to the power receiving device,
the power receiving device
receives the determination reference information,
selects, based on the determination reference information, the power transmission device from which the power receiving device is to receive power supply, and
transmits a power transmission start request to the selected power transmission device, and
the power transmission device starts power transfer to the power receiving device when receiving the power transmission start request.

According to one or more embodiments of the present invention, the power receiving device selects the power transmission device, from which the power receiving device is to receive power supply, based on the determination reference information generated by each of the power transmission devices based on the request-power, thus it is possible to select the power transmission device appropriately so as to perform power supply to the power receiving device.

In another aspect, one or more embodiments of the present invention may be a wireless power transfer system, wherein the system is communicably connected to a position information providing device that acquires a current position of the power receiving device, the power transmission device acquires a current position of the power receiving device from the position information providing device, obtains a distance from the power transmission device to the power receiving device based on the acquired current position, obtains transmission efficiency in transferring power to the power receiving device, the transmission efficiency corresponding to the obtained distance, generates the determination reference information based on the received request-power and the obtained transmission efficiency, and transmits the generated determination reference information to the power receiving device.

According to one or more embodiments of the present invention, the power transmission device obtains the transmission efficiency in transferring power to the power receiving device and generates the determination reference information based on the obtained transmission efficiency and the request-power, thus the power receiving device can select a power transmission device suitable for receiving power supply therefrom based on the request-power and the transmission efficiency.

In another aspect, one or more embodiments of the present invention may be a wireless power transfer system, wherein the position information providing device includes a plurality of antennas arranged adjacent to one another, the plurality of antennas receiving a positioning signal that is a wireless signal to be transmitted from the power receiving device, obtains a direction α where the power receiving device exists as seen from the position information providing device, based on a phase difference of the received positioning signals, and obtains a current position of the power receiving device based on the obtained direction α.

According to one or more embodiments of the present invention, the current position of the power receiving device can be acquired accurately, thus the power transmission device can accurately obtain the transmission efficiency in transmitting power to the power receiving device, the power receiving device can select the power transmission device suitable for receiving power supply therefrom, and receive power supply.

Another aspect of one or more embodiments of the present invention is the wireless power transfer system, wherein the power transmission device determines whether or not the transmission efficiency exceeds a predetermined threshold, and generates the determination reference information based on a result of the determination, and the power receiving device selects the power transmission device based on the generated determination reference information.

According to one or more embodiments of the present invention, the power receiving device can select the power transmission device based on whether or not the transmission efficiency exceeds the threshold, thus the power receiving device can select the power transmission device suitable for receiving power supply therefrom, and receive power supply.

In another aspect, one or more embodiments of the present invention may be a wireless power transfer system, wherein the power transmission device stores a movement history of the power receiving device based on the current position of the power receiving device which is acquired from the position information providing device, and generates the determination reference information based on the movement history, and the power receiving device selects the power transmission device based on the generated determination reference information.

According to one or more embodiments of the present invention, the power receiving device selects the power transmission device from which the power receiving device is to receive power supply based on the determination reference generated by the power transmission device based on the movement history of itself, thus the power receiving device can select the power transmission device suitable for receiving power supply therefrom and receive power supply.

Other embodiments of the present invention will become clear with reference to modes to carry out the invention and the drawings.

According to one or more embodiments of the present invention, it is possible to appropriately select the power transmission device to perform power transmission to the power receiving device. Furthermore, one of ordinary skill in the art would appreciate that certain "sections" or "devices" of one or more embodiments of the present invention can include or be implemented by a processor or circuit.

BRIEF DESCRIPTION OF DRAWINGS

FIG. 15 shows an example of a determination reference information management table 250 according to one or more embodiments of the invention.

FIG. 16 shows a data structure of a power transmission start request 160 according to one or more embodiments of the invention.

DESCRIPTION OF EMBODIMENTS

Below, modes to carry out the invention are described with reference to the drawings.

Figure 1:
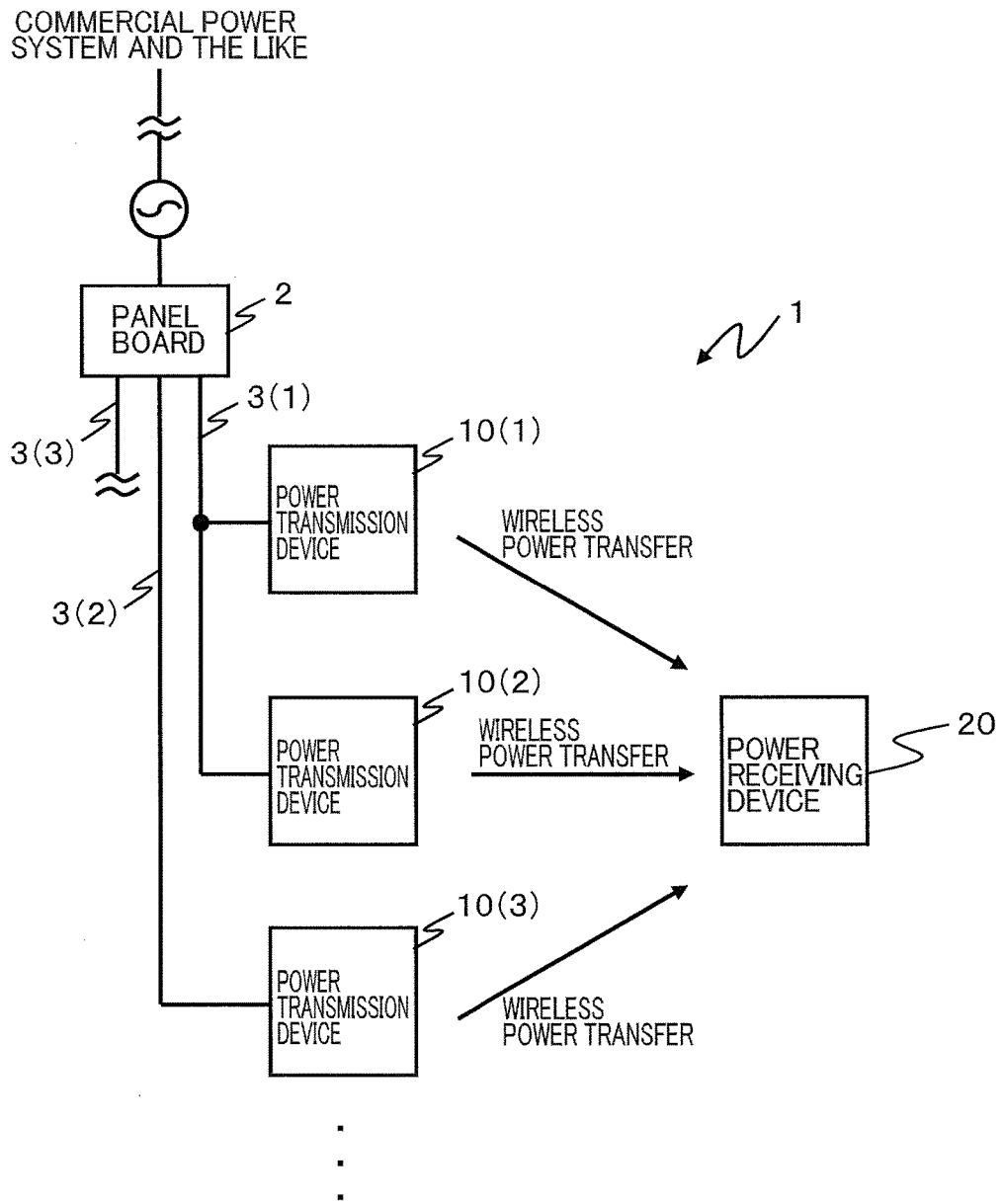
FIG. 1 shows a configuration of a wireless power transfer system 1 according to one or more embodiments of the invention.

FIG. 1 shows a schematic configuration of a wireless power transfer system 1 that will be explained as an example of one or more embodiments. As shown in the drawing, the wireless power transfer system 1 includes one or more power receiving devices 20, and a plurality of power transmission devices 10(1), 10(2), 10(3) . . . that perform wireless power transfer to the power receiving device 20. As shown in the drawing, drive power is supplied to each of the power transmission devices 10(1), 10(2), 10(3) . . . from a panel board 2 connected to a commercial power system and the like, through electric circuits 3(1), 3(2), 3(3) . . . such as a distribution line.

The power receiving device 20 is, for example, a mobile phone, a mobile data terminal, a compact household electrical appliance, an electric vehicle or the like. The power transmission device 10 is provided in an environment (such as indoors where a user of the power receiving device 20 goes in and out, and outdoors through which a user of the power receiving device 20 passes) where the power receiving device 20 is used.

Figure 2:
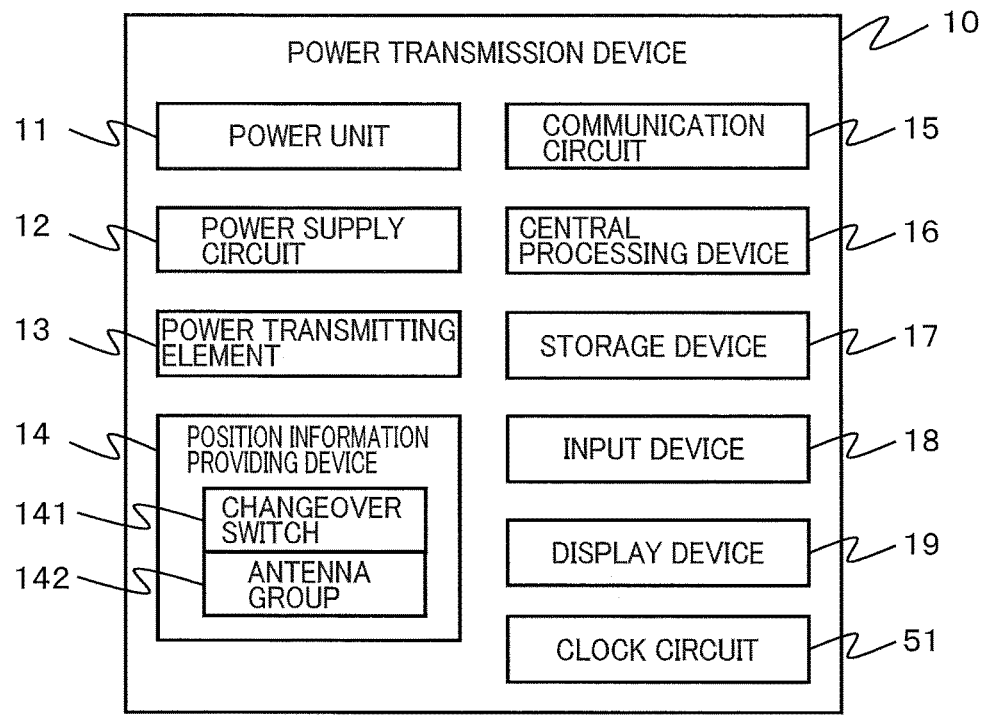
FIG. 2 shows a hardware configuration of a power transmission device 10 according to one or more embodiments of the invention.

FIG. 2 shows a hardware configuration of the power transmission device 10. As shown in the drawing, the power transmission device 10 includes a power unit 11, a power supply circuit 12, a power transmitting element 13, a position information providing device 14, a communication circuit 15, a central processing device 16, a storage device 17, an input device 18, a display device 19 and a clock circuit 51. It should be noted that, the position information providing device 14 may be integrally constituted with the power transmission device 10, or may be provided separately from the power transmission device 10.

The power unit 11 is, for example, a switching power source or a linear power source, and supplies power to drive elements of the power transmission device 10.

The power supply circuit 12 includes a driver circuit (such as a gate driver, a half-bridge driver) to generate, based on power supplied from the power unit 11, a drive current of a prescribed frequency, which is to be supplied to the power transmitting element 13.

The power transmitting element 13 generates a magnetic field, an electric field or an electromagnetic field to perform power supply to the power receiving device 20. For example, in a case where the wireless power transfer described above is performed by a magnetic field method (a magnetic field coupling method, a magnetic resonance method), the power transmitting element 13 is an inductive element such as a coil. Further, for example, in a case where the wireless power transfer described above is performed by an electric field method (an electric field coupling method, an electric field resonance method), the power transmitting element 13 is a capacitive element such as a capacitor. Further, for example, in a case where the wireless power transfer is performed by an electromagnetic wave method, the power transmitting element 13 is an antenna.

The position information providing device 14 has a changeover switch 141 and an antenna group 142, and receives from the power receiving device 20 a wireless signal (hereinafter, referred to as a positioning signal 600) used for positioning to be described later.

The communication circuit 15 performs wired communication or wireless communication among the power receiving device 20, the other power transmission devices 10 and the panel board 2 (or a smart meter provided in the panel board 2) through a communication means (wireless LAN (LAN: Local Area Network), wireless communication using IEEE 802.15.1 standard, wireless communication using IEEE 802.15.4 standard, IrDA (Infrared Data Association), Power Line Communication (PLC) and the like). It should be noted that, the communication between the power transmission device 10 and the power receiving device 20 may be performed by modulating a power transmission signal, that is, by allowing the power transmission signal to include information to be transmitted.

The central processing device 16 is configured with a CPU or a MPU, and performs an overall control of the power transmission device 10. The storage device 17 is configured with such as RAM, ROM, NVRAM and stores program and data. The input device 18 is, for example, a touch panel, ten keys and the like, and receives an input of data in accordance with an operational input of the user. The display device 19 is a liquid crystal panel, an organic EL panel or the like. The clock circuit 51 is, for example, configured with a real time clock (RTC), and generates date and time information (time stamp) such as current date and time.

Figure 3:
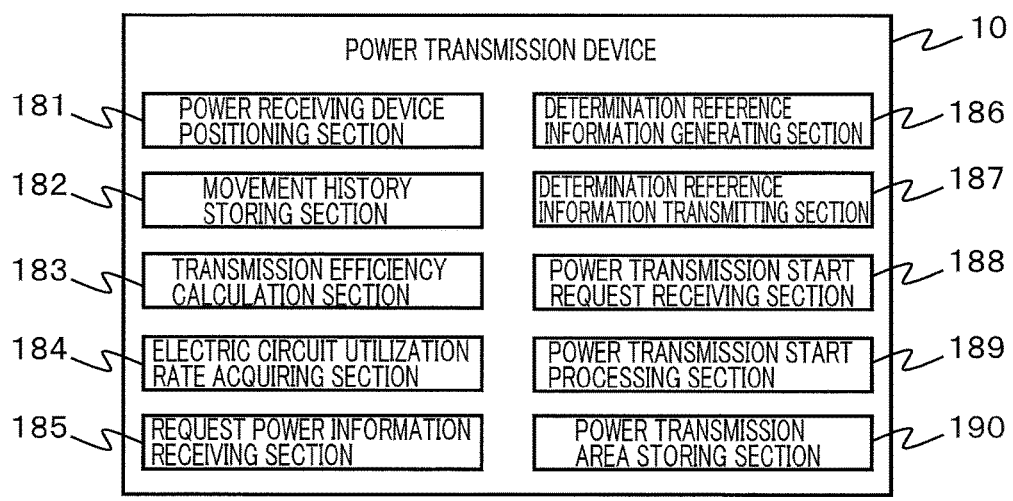
FIG. 3 shows main functions of the power transmission device 10 according to one or more embodiments of the invention.

FIG. 3 shows main functions of the power transmission device 10. As shown in the drawing, the power transmission device 10 includes a power receiving device positioning section 181, a movement history storing section 182, a transmission efficiency calculation section 183, an electric circuit utilization rate acquiring section 184, a request power information receiving section 185, a determination reference information generating section 186, a determination reference information transmitting section 187, a power transmission start request receiving section 188, a power transmission start processing section 189, and a power transmission area storing section 190. It should be noted that, these functions are realized by hardware of the power transmission device 10, or the central processing device 14 of the power transmission device 10 reading and executing programs stored in the storage device 15.

In these, the power receiving device positioning section 181 acquires a current position of the power receiving device 20 from the position information providing device 14. It should be noted that, the position information providing device 14 will be described in detail later.

The movement history storing section 182 stores a movement history of the power receiving device 20 based on the current position of the power receiving device 20, which is acquired from the position information providing device 14. The movement history storing section 182 stores the movement history of the power receiving device 20, for example, as data in which the position information of the power receiving device 20 shown with a two-dimensional coordinate system is associated with a time when the position information is acquired.

The transmission efficiency calculation section 183 obtains the distance from the power transmission device 10 to the power receiving device 20 based on the current position of the power receiving device 20, which is acquired by the power receiving device positioning section 181, and obtains transmission efficiency η in transferring power to the power receiving device 20 based on the determined distance.

The electric circuit utilization rate acquiring section 184 acquires utilization rates r(1), r(2) . . . of the respective electric circuits 3(1), 3(2) . . . to which each of the power transmission devices 10 is connected. The utilization rate r is represented, for example, by the proportion of the current value flowing the electric circuit 3 at present, with respect to the maximum suppliable current value (current value considering a safety factor). It should be noted that, the electric circuit utilization rate acquiring section 184 acquires the utilization rates r(1), r(2) . . . of the respective electric circuits 3(1), 3(2) . . . , for example, by exchanging information among other electrical products (including other power transmission devices 10) which are connected to the same electric circuit 3 about current values consumed by each of the products at present. Further, the electric circuit utilization rate acquiring section 184 communicates with the panel board 2 (or a smart meter and the like which is provided in the panel board 2), for example, through the communication means described above, and acquires utilization rates r(1), r(2) . . . of the respective electric circuits 3(1), 3(2) . . . from the panel board 2 (or the smart meter and the like which is provided in the panel board 2).

The request power information receiving section 185 receives request power information 1200 to be described later, which is transmitted from the power receiving device 20.

The determination reference information generating section 186 generates information (hereinafter, referred to as determination reference information 170) to be used as a determination reference when the power receiving device 20 selects the power transmission device 10. The determination reference information 170 will be described in detail later.

The determination reference information transmitting section 187 transmits, to the power receiving device 20, determination reference information 170 generated by the determination reference information generating section 186.

The power transmission start request receiving section 188 receives a power transmission start request that is transmitted from the power receiving device 20.

When the power transmission start request receiving section 188 receives the power transmission start request, the power transmission start processing section 189 starts wireless power transfer to the power receiving device 20.

The power transmission area storing section 190 stores information (hereinafter, referred to as power transmission area information) that identifies a power transmission area. The power transmission area information is shown, for example, with a two-dimensional coordinate system.

Figure 4:
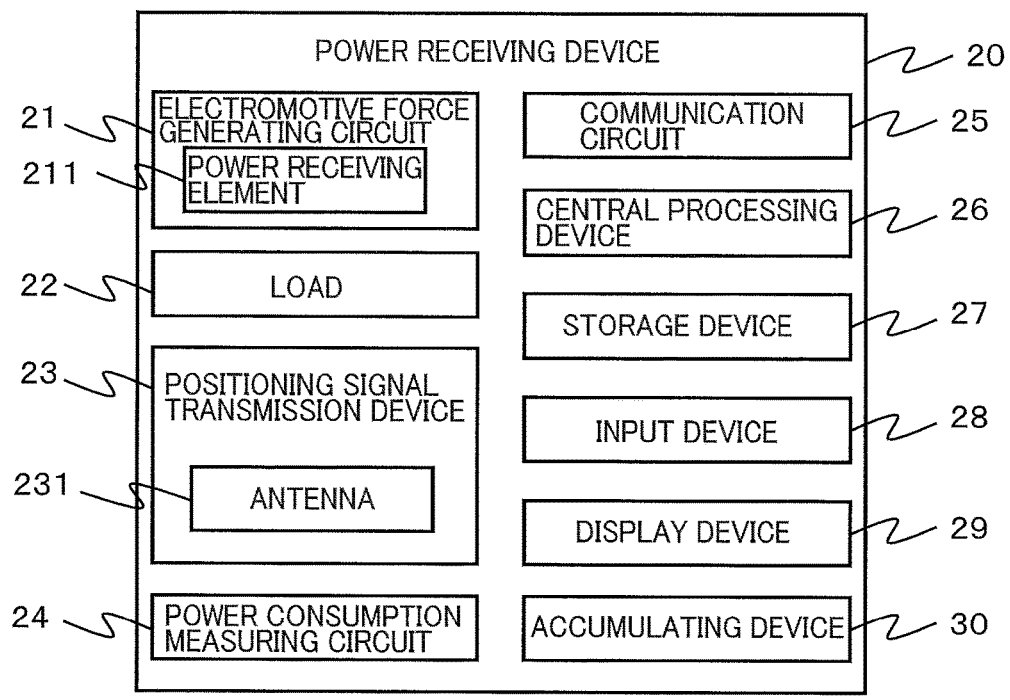
FIG. 4 shows a hardware configuration of a power receiving device 20 according to one or more embodiments of the invention.

FIG. 4 shows a hardware configuration of the power receiving device 20. As shown in the drawing, the power receiving device 20 includes an electromotive force generating circuit 21, a load 22, a positioning signal transmission device 23, a power consumption measuring circuit 24, a communication circuit 25, a central processing device 26, a storage device 27, an input device 28, a display device 29, and an accumulating device 30.

The electromotive force generating circuit 21 is configured with a power receiving element 211 such as a power receiving side coil. In the electromotive force generating circuit 21, electromotive force is generated by the magnetic field, the electric field, or the electromagnetic field sent from the power transmission device 10. The electromotive force generated in the electromotive force generating circuit 21 is used as drive power of hardware and charging power of the accumulating device 30 provided in the power receiving device 20.

The load 22 is, for example, in a case where the power receiving device 20 is an electrical appliance, hardware that contributes to the realization of service provided to users by the electrical appliance. Also, for example, in a case where the power receiving device 20 is a mobile phone, the load 22 is hardware (a receiving circuit, a transmitting circuit and the like) that realizes a communication function of the mobile phone.

The positioning signal transmission device 23 includes a transmitting circuit of the positioning signal 600 to be described later and an antenna 231 that transmits the positioning signal 600.

The power consumption measuring circuit 24 measures the present power consumption of hardware of the power receiving device 20. The power consumption includes, for example, drive power of the central processing device 26 or the communication circuit 25, drive power of the load 22, charging power of the accumulating device 30, and the like.

The communication circuit 25 is a circuit for realizing wireless communication between the power receiving device 20 and the power transmission device 10 through a communication means (wireless LAN, wireless communication using IEEE 802.15.1 standard, wireless communication using IEEE 802.15.4 standard, IrDA and the like).

The central processing device 26 is configured with such as a CPU or MPU, and performs a centralized control of the power receiving device 20. The storage device 27 is configured with such as RAM, ROM, NVRAM, and stores program and data. The input device 28 is such as a keyboard and a touch panel. The display device 29 is such as a liquid crystal panel.

The accumulating device 30 includes an accumulator battery such as a secondary battery (such as a lithium-ion battery, a lithium polymer battery, a nickel metal hydride battery, a nickel-cadmium battery) and a capacitative element (such as an electrical double-layer capacitor), a rectifying circuit that supplies to the accumulator battery a current based on an electromotive force generated with the electromotive force generating circuit 21, a smoothing circuit, and a transmission circuit such as a DC/AC converter and a DC/DC converter. Note that, the power receiving device 20 does not necessarily have to include the accumulating device 30. For example, the power receiving device 20 may be configured so as to directly supply, to the load 22, a current based on the electromotive force generated with the electromotive force generating circuit 21.

Figure 5:
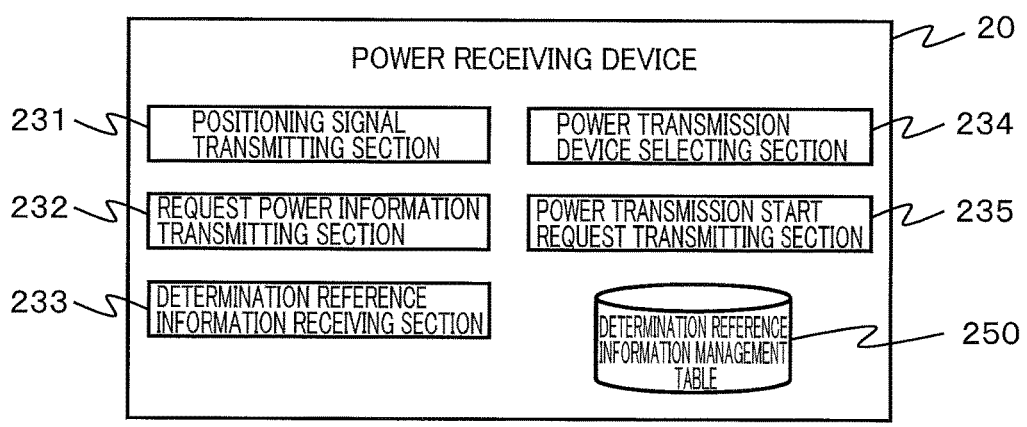
FIG. 5 shows main functions of the power receiving device 20 according to one or more embodiments of the invention.

FIG. 5 shows main functions of the power receiving device 20. As shown in the drawing, the power receiving device 20 includes a positioning signal transmitting section 231, a request power information transmitting section 232, a determination reference information receiving section 233, a power transmission device selecting section 234, and a power transmission start request transmitting section 235. It should be noted that, these functions are realized by hardware of the power receiving device 20, or the central processing device 26 of the power receiving device 20 reading and executing programs stored in the storage device 27.

In these, positioning signal transmitting section 231 controls the positioning signal transmission device 23 to transmit a positioning signal 600 from the antenna 231.

The request power information transmitting section 232 generates request power information 1200 described later, and transmits this information to the power transmission device 10.

The determination reference information receiving section 233 receives the determination reference information 170 that is transmitted from the power transmission device 10. The determination reference information 170 will be described in detail later.

The power transmission device selecting section 234 selects the power transmission device 10 from which the power receiving device itself receives power supply, based on the determination reference information 170 that has been transmitted from the power transmission device 10.

The power transmission start request transmitting section 235 transmits a power transmission start request to the power transmission device 10 selected by the power transmission device selecting section 234.

Further, as shown in the drawing, the power receiving device 20 stores a determination reference information management table 250. The determination reference information management table 250 will be described in detail later.

<Mechanism of Positioning>

Next, the mechanism of positioning the current position of the power receiving device 20 is explained. It should be noted that, as a premise of the following explanation, the power receiving device 20 repeatedly (for example, periodically) transmits a positioning signal 600 formed of a wireless signal that is a spread spectrum, from the antenna 231 in a sufficiently short time interval. Further, the power transmission device 10 receives the positioning signal 600 which is transmitted from the power receiving device 20, while switching the plurality of antennas constituting the antenna group 142 in a sufficiently short cycle.

Figure 6:
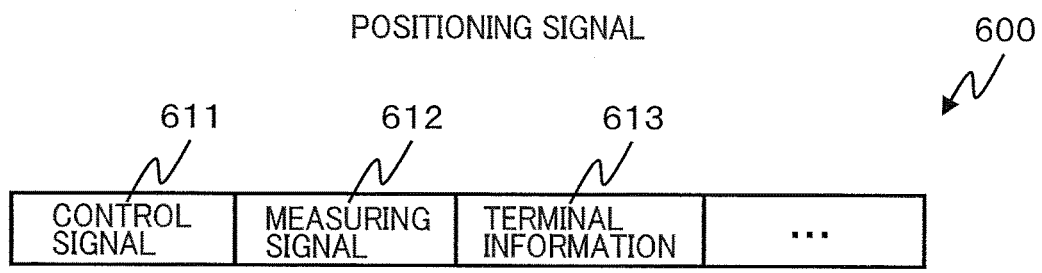
FIG. 6 shows a configuration of a positioning signal 600 according to one or more embodiments of the invention.

FIG. 6 shows a configuration of the positioning signal 600. As shown in the drawing, the positioning signal 600 includes a signal and information such as a control signal 611, a measuring signal 612, terminal information 613 and the like.

In these, the control signal 611 includes modulated waves and various control signals. The measuring signal 612 includes nonmodulated waves of approximately several meters/sec (for example, signals (for example, a spread code of a 2048-chip) used for detection of a direction where the power receiving device 20 exists in respect to the transmission device 10 and a relative distance of the power receiving device 20 in respect to the transmission device 10). The terminal information 613 includes identifiers (power receiving device ID) allocated to each of the power receiving devices 20.

Figure 7:
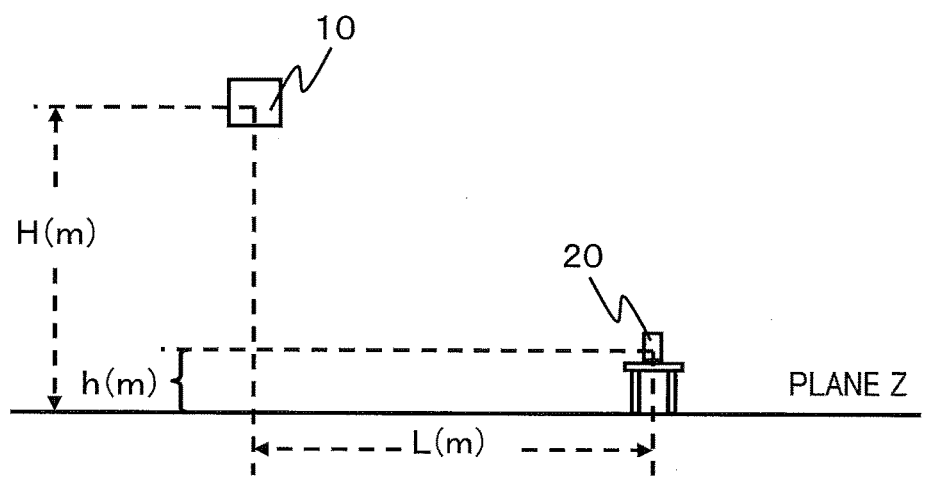
FIG. 7 describes a positional relationship (way of setting variables indicating a height and a distance) between the power transmission device 10 and the power receiving device 20 according to one or more embodiments of the invention.

FIG. 7 shows a positional relationship (way of setting variables indicating a height and a distance) between the power transmission device 10 and the power receiving device 20. In this example, the power receiving device 20 is located at a height of h(m) from a plane Z, and the power transmission device 10 is fixed to a height of H(m) from the plane Z. A slant distance on the plane Z from directly below the power transmission device 10 to the power receiving device 20 is L(m).

Figure 8:
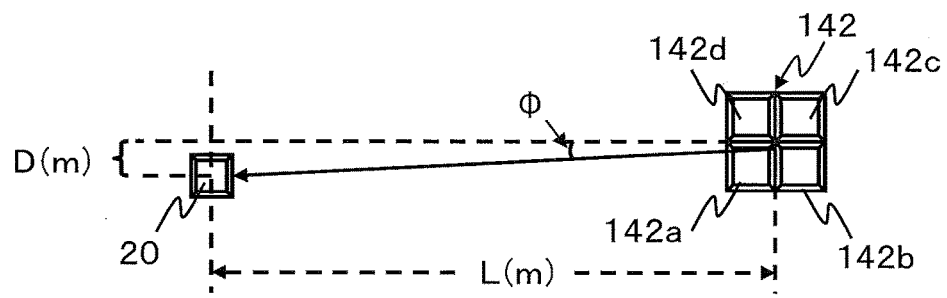
FIG. 8 shows a relationship between an antenna group 142 of the power transmission device 10 and the power receiving device 20 according to one or more embodiments of the invention.

FIG. 8 shows a relationship between the antenna groups 142 of the power transmission device 10 and the power receiving device 20. As shown in the drawing, in this example, the antenna groups 142 are configured with four circular polarized directional antennas 142a-142d arranged adjacent to one other in equal intervals in a two-dimensional plane in a substantially square shape in an interval of one wavelength or less of the positioning signal 600 (for example, in a case that the positioning signal 600 is a radio wave of 2.4 GHz band, an interval of equal to or less than one wavelength (12.5 cm)).

In the drawing, if an angle between a horizontal direction in a height position of the antenna groups 142 and a direction of the power receiving device 20 in respect to the antenna groups 142 is $\Phi$, there is the following relationship between them.

$$\Phi = \text{arcTan}(D(m)/L(m)) = \text{arcSin}(\Delta L(\text{cm})/6 \ (\text{cm}))$$

It should be noted that, $\Delta L(\text{cm})$ is a difference in length of transmission paths (a path difference) between two specific antennas, of the antennas constituting the antenna groups 122, and the power receiving device 20.

Here, in a case where a phase difference of the positioning signals 600 received by the two specific antennas 142, of the four antennas 142a-142d, is $\Delta\theta$, there is the following relationship.

$$\Delta L(\text{cm}) = \Delta\theta/(2\pi/\lambda(\text{cm}))$$

Here, for example, in a case where the positioning signal 600 is a radio wave of a 2.4 GHz band (wavelength $\lambda$=12.5 (cm)), $$\Phi = \text{arcSin}(\Delta\theta/\pi),$$

in a measureable range ($-\pi/2 < \Delta\theta < \pi/2$), $\Phi = \Delta\theta$ (radian), and thus a direction $\Phi$ where the power receiving device 20 exists can be specified from the phase difference $\Delta\theta$.

Figure 9:
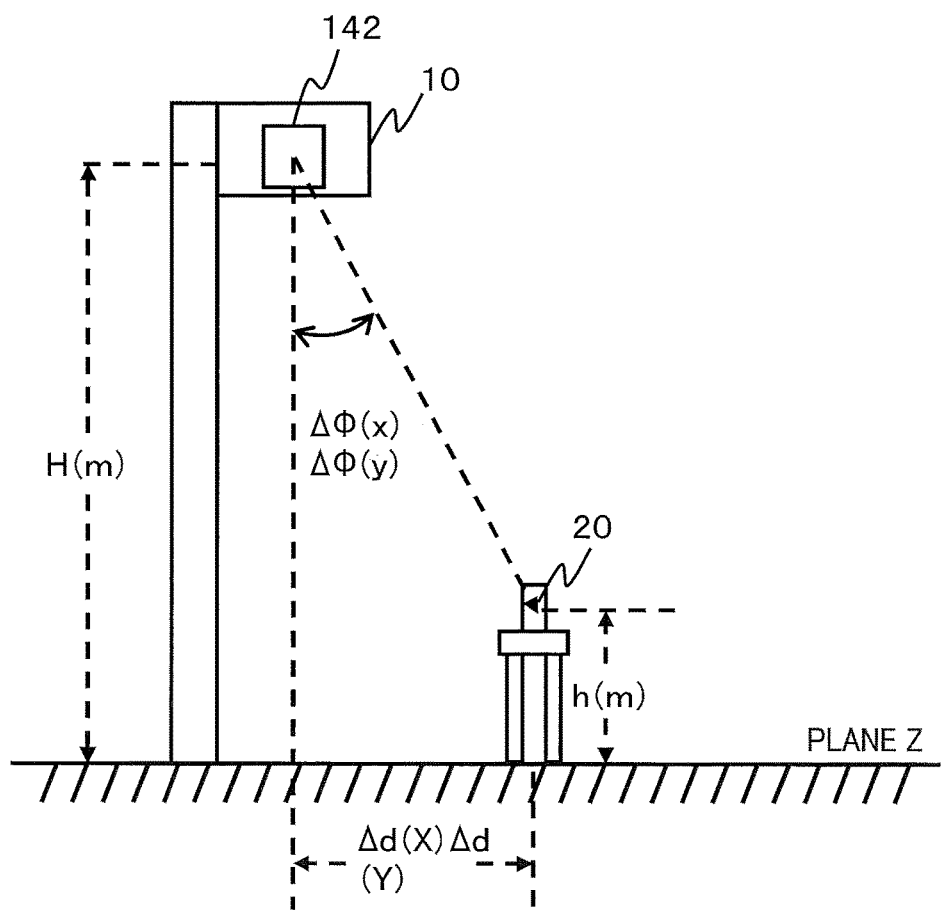
FIG. 9 shows a positional relationship (way of setting variables indicating a height, a distance and an angle) between the power transmission device 10 and the power receiving device 20 according to one or more embodiments of the invention.

It should be noted that, as shown in FIG. 9, when the height of the antenna group 142 of the power transmission device 10 is H(m), the height of the power receiving device 20 is h(m), in a case where a position on the plane Z directly below the power transmission device 10 is an origin and rectangular coordinates (X, Y) are set on the plane Z, an angle between the direction from the power transmission device 10 to the power receiving device 20 and the x axis is $\Delta\Phi(x)$ which is obtained from the above direction $\Phi$, and an angle between the direction from the power transmission device 10 to the power receiving device 20 and the y axis is $\Delta\Phi(y)$, then the position of the power receiving device 20 in respect to the origin can be obtained from the following equation.

$$\Delta d(x) = (H-h) \times \text{Tan}(\Delta\Phi(x))$$

$$\Delta d(y) = (H-h) \times \text{Tan}(\Delta\Phi(y))$$

Then, when a point of intersection of the plane Z and a perpendicular line dropped from the power transmission device 10 to the plane Z is the origin (X1, Y1), the current position (Xx, Yy) of the power receiving device 20 can be obtained from the following equation.

$$Xx = X1 + \Delta d(x)$$

$$Yy = Y1 + \Delta d(y)$$

The methods of positioning explained above are also explained in detail in for example, Japanese Patent Laid-open Application No. 2004-184078, Japanese Patent Laid-open Application No. 2005-351877, Japanese Patent Laid-open Application No. 2005-351878, and Japanese Patent Laid-open Application No. 2006-23261.

<Description of Process>

Next, a process, between the power receiving device 20 and the power transmission device 10, performed when the power receiving device 20 receives wireless power transfer from the power transmission device 10 (hereinafter, referred to as a power transmission process S1000) will be explained with the flowcharts shown in FIGS. 10 and 11.

Figure 10:
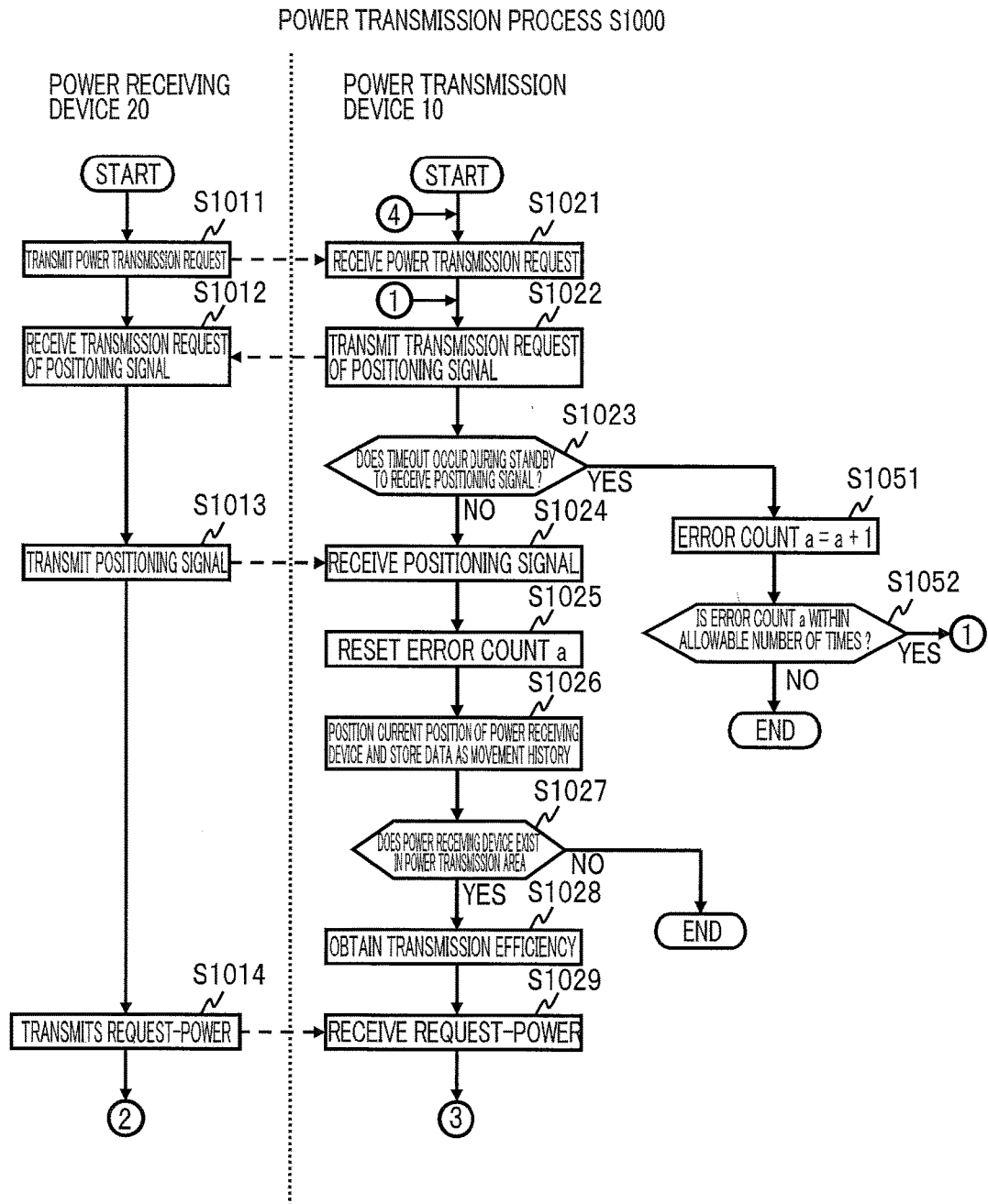
FIG. 10 is a flowchart describing a power transmission process S1000 according to one or more embodiments of the invention.

As shown in FIG. 10, a power transmission request is firstly transmitted from the power receiving device 20 (S1011). When receiving the power transmission request from the power receiving device 20, the power transmission device 10 transmits a transmission request of the positioning signal 600 (S1021, S1022), and waits for reception of the positioning signal 600 for a predetermined time (S1023).

In a case where the power transmission device 10 does not receive the positioning signal 600 in the predetermined time (in a case where a timeout occurs) (S1023: YES), the power transmission device 10 adds 1 to an error count a (S1051).

Further, the power transmission device 10 determines whether or not the error count a exceeds allowable number of times (allowable number of times set for the error count a in advance) (S1052), and when the error count a exceeds the allowable number of times (S1052: NO), the power transmission device 10 aborts the waiting of the reception of the positioning signal 600 that is to be transmitted from the power receiving device 20. Further, in a case where power transfer has been started to the power receiving device 20 in a process S1033 described later, the power transmission device 10 stops the power transfer.

It should be noted that, as a case where the above error count a exceeds the allowable number of times, in other words, as a case where it is impossible to receive the positioning signal 600 from the power receiving device 20, there is a case where any failure occurs in the power receiving device 20, a case where the power receiving device 20 has moved to a location apart from the power transmission device 10 after the power receiving device 20 transmits the power transmission request (S1011), and the like.

When receiving the above transmission request (S1012), the power receiving device 20 transmits the positioning signal 600 (S1013).

When receiving the positioning signal 600 from power receiving device 20 in the predetermined time (S1023: NO, S1024), the power transmission device 10 resets the error count a (S1025), and positions the current position of the power receiving device 20 using the received positioning signal 600 (S1026). It should be noted that, the power receiving device 20 stores data in which the current position of the positioned power receiving device 20 is associated with a current time, as a movement history.

The power transmission device 10 determines whether or not the power receiving device 20 exists in the power transmission area at present based on the current position of the power receiving device 20 obtained in S1026 (S1027).

In a case where the power receiving device 20 exists in the power transmission area at present (S1027: YES), the process proceeds to S1028. On the other hand, in a case where the power receiving device 20 does not exist in the power transmission area at present (S1027: NO), the power transmission process S1000 is terminated.

In S1028, the power transmission device 10 obtains the distance between the power receiving device 20 and itself based on the current position of the power receiving device 20, which has been obtained in S1026, and from the obtained distance, determines transmission efficiency η in transferring power to the power receiving device 20. For example, the power transmission device 10 obtains the transmission efficiency η from the following equation based on a multiplied value S of a coupling coefficient (k) (k is determined according to the distance) between the power transmission device 10 and the power receiving device 20, and a Q-value.

$$\eta = ((1+S^2)^{(1/2)} \times (S^2)) / (((1+(1+S^2)^{(1/2)}) \times (S^2)) + ((1+(1+S^2)^{(1/2)})^2))$$

On the other hand, after transmitting the positioning signal 600 (S1013), the power receiving device 20 generates request-power P and transmits, to the power transmission device 10, request power information 1200 to which the generated request-power P is set (S1014). It should be noted that, the power receiving device 20, for example, generates the request-power P based on the present power consumption of the power receiving device 20. After that, the power receiving device 20 waits for the reception of the determination reference information 170 transmitted from the power transmission device 10 for a predetermined time.

Figures 12, 13:
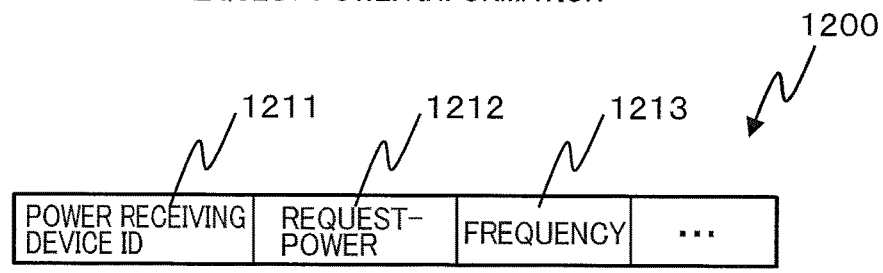
FIG. 12 shows a data structure of request power information 1200 according to one or more embodiments of the invention.
FIG. 13 shows a data structure of determination reference information 170 according to one or more embodiments of the invention.

FIG. 12 shows a data structure of request power information 1200 that is transmitted from the power receiving device 20. As shown in the drawing, the request power information 1200 includes information corresponding to each item of a power receiving device ID 1211, request-power 1212, and a frequency 1213.

In these, the power receiving device ID 1211 is set with identifiers (power receiving device ID) allocated to each of the power receiving devices 20. The request-power 1212 is set with request-power P. The frequency 1213 is set with a channel (frequency of power to be supplied (for example, a resonance frequency)) which is used when the power receiving device 20 receives power supply.

Referring back to FIG. 10, when receiving request power information 1200 (S1029), the power transmission device 10 generates the determination reference information 170, and transmits this information to the power receiving device 20 (S1400 of FIG. 11; hereinafter, this process is referred to as a determination reference information transmission process S1400).

FIG. 13 shows a data structure of determination reference information 170. As shown in the drawing, the determination reference information 170 includes information corresponding to each item of a power transmission device ID 171, a request power determination reference 172, a transmission efficiency determination reference 173, a movement history determination reference 174, and a circuit utilization rate determination reference 175.

In these, the power transmission device ID 171 is set with identifiers (hereinafter, referred to as a power transmission device ID) of the power transmission device 10 that has generated the determination reference information 170.

The request power determination reference 172 is set with a determination reference based on request-power P that is set to request-power 1212 of the request power information 1200 transmitted by the power receiving device 20.

Further, the transmission efficiency determination reference 173 is set with a determination reference based on transmission efficiency η.

Further, the movement history determination reference 174 is set with a determination reference based on the movement history of the power receiving device 20.

The circuit utilization rate determination reference 175 is set with a determination reference based on the utilization rate r of the electric circuit 3.

Figure 11:
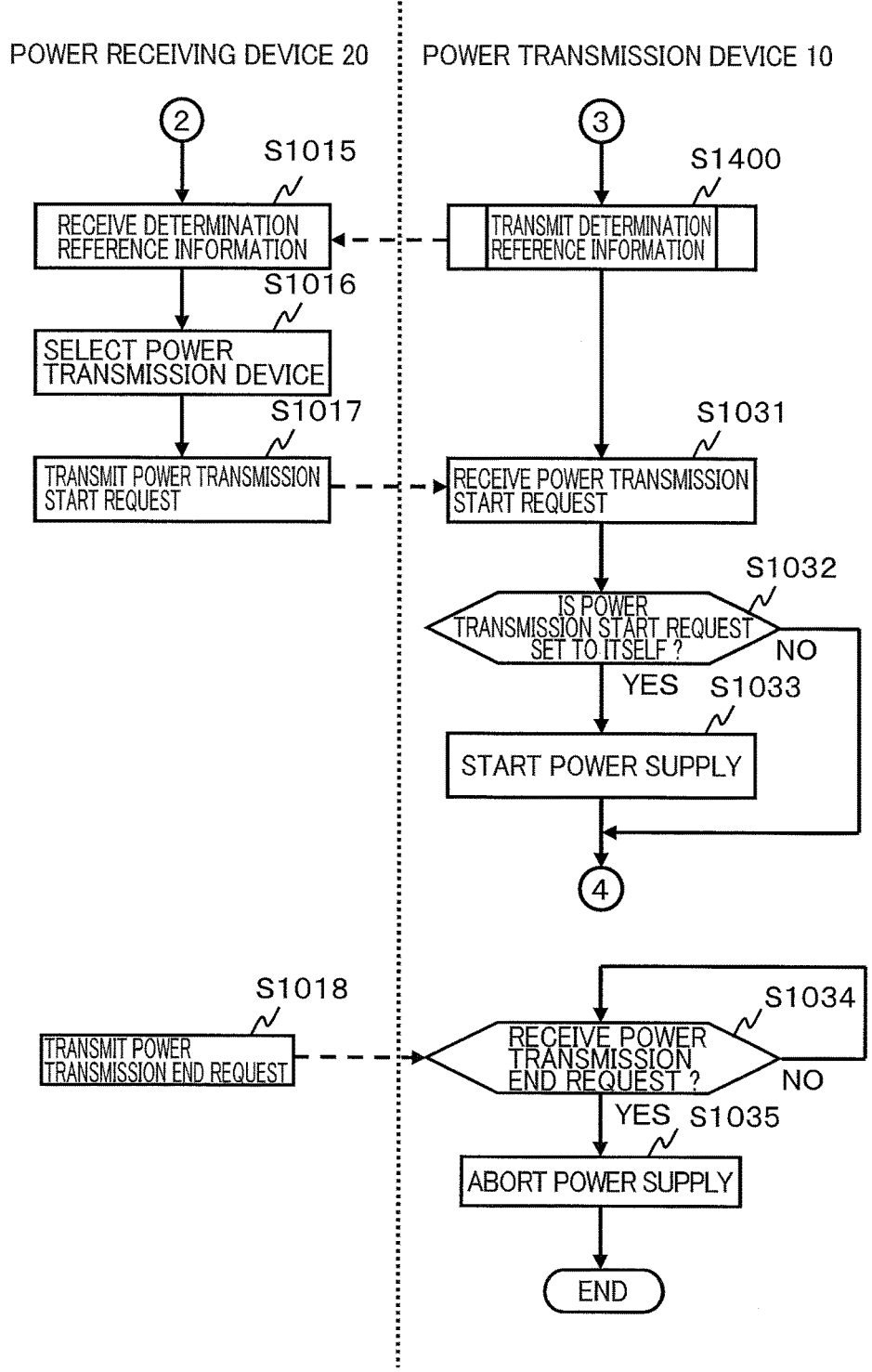
FIG. 11 is a flowchart describing a power transmission process S1000 according to one or more embodiments of the invention.
Figure 14:
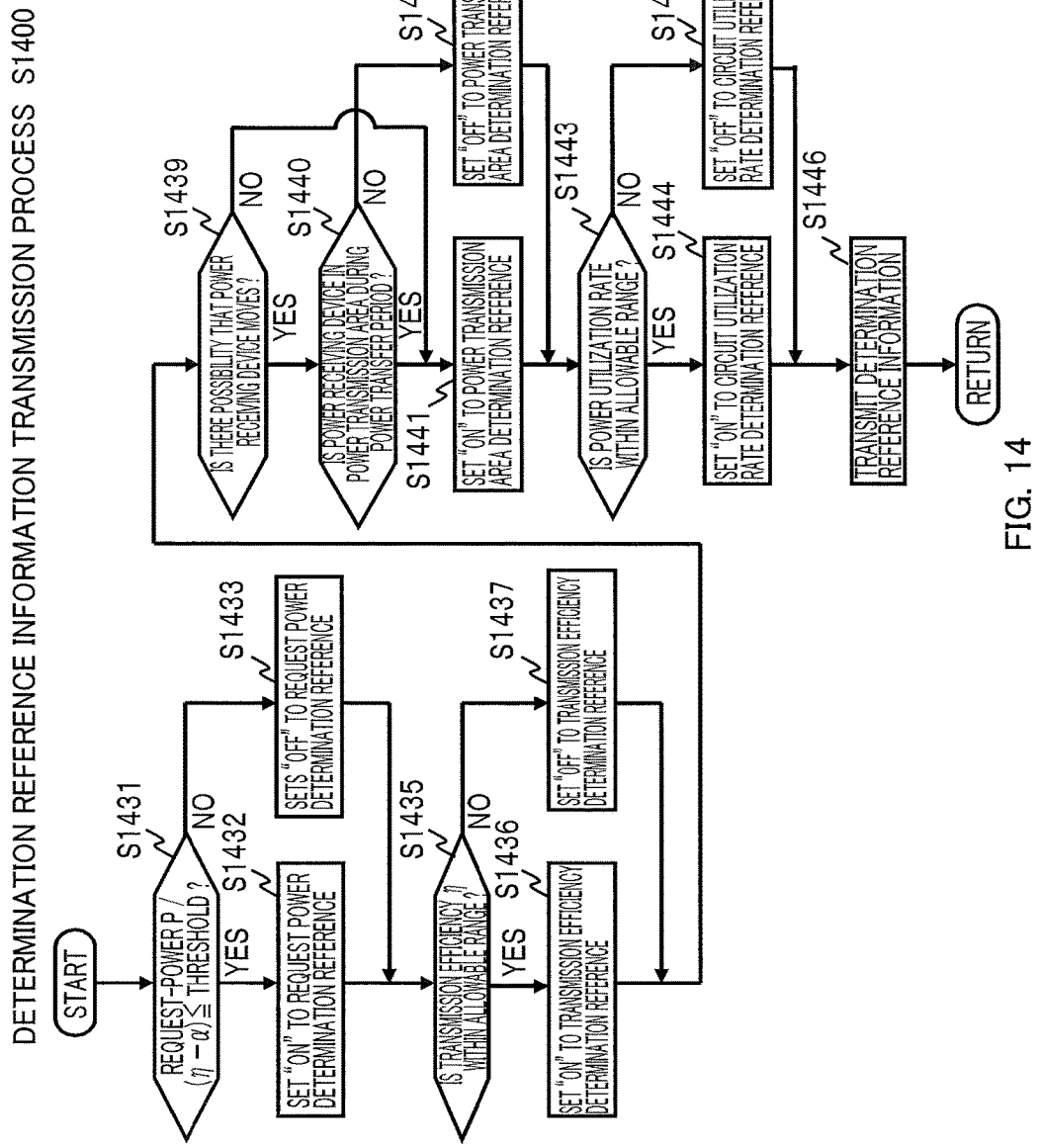
FIG. 14 is a flowchart describing the detail of a determination reference information transmission process S1400 according to one or more embodiments of the invention.

FIG. 14 shows a detail of the determination reference information transmission process S1400 of FIG. 11. Below, the determination reference information transmission process S1400 will be explained with reference to the figure.

As shown in the drawing, the power transmission device 10 firstly determines whether the request-power P/(η−α) (where α is tolerance) exceeds a predetermined threshold based on the request-power P and the transmission efficiency η obtained in S1028 (S1431).

In a case where the request-power P/(η−α) is less than or equal to the predetermined threshold (for example, a maximum allowable value set in accordance with power supply capability of the power transmission device 10) (S1431: YES), the power transmission device 10 sets "ON" to the request power determination reference 172 of the determination reference information 170 (S1432). Then, the process proceeds to S1435.

On the other hand, in a case where the request-power P/(η−α) exceeds the threshold described above (S1431:

NO), the power transmission device 10 sets "OFF" to the request power determination reference 172 of the determination reference information 170 (S1433). Then, the process proceeds to S1435.

In S1435, the power transmission device 10 determines whether or not the transmission efficiency η obtained in S1028 is within an allowable range. Specifically, the power transmission device 10 determines whether or not the transmission efficiency η is within the allowable range by comparing the predetermined threshold with a multiplied value of the transmission efficiency η obtained in S1028 and a predetermined ratio (for example, a ratio determined based on an error in calculating the distance between the power transmission device 10 and the power receiving device 20, measurement accuracy of the power consumption measuring circuit 24, atmospheric pressure, air temperature or the like).

In a case where the transmission efficiency η is within the allowable range (S1435: YES), the power transmission device sets "ON" to the transmission efficiency determination reference 173 of the determination reference information 170 (S1436). Then, the process proceeds to S1439.

On the other hand, in a case where the transmission efficiency η is not within the allowable range (S1435: NO), the power transmission device 10 sets "OFF" to the transmission efficiency determination reference 173 of the determination reference information 170 (S1437). Then, the process proceeds to S1439.

In S1439, the power transmission device 10 determines whether or not there is a possibility that the power receiving device 20 moves. Specifically, for example, the power transmission device 10 refers to the movement history of the power receiving device 20 in the predetermined period and determines whether or not there is a possibility that the power receiving device 20 moves, depending on whether or not the movement distance of the power receiving device 20 in the predetermined period is less than or equal to the predetermined threshold.

In a case where the power transmission device 10 determines there is a possibility that the power receiving device 20 moves (S1439: YES), the process proceeds to S1440. On the other hand, in a case where the power transmission device 10 determines there is no possibility that the power receiving device 20 moves (S1439: NO), the power transmission device 10 sets "ON" to the movement history determination reference 174 of the determination reference information 170 (S1441). Then, the process proceeds to S1443.

In S1440, the power transmission device 10 determines whether or not the power receiving device 20 is always in the power transmission area of itself during the power transfer period when the power transfer is performed to the power receiving device 20 by itself. For example, the power transmission device 10 estimates the area where the power receiving device 20 exists from the present to after the predetermined time based on the movement history of the power receiving device 20 (for example, this estimation is performed using filter processing such as a Kalman filter), checks whether or not the estimated existence area is in the power transmission area of itself, and thereby determines whether or not the power receiving device 20 is always in the power transmission area of itself during the power transfer period.

In a case where it is determined that the power receiving device 20 is always within the power transmission area of itself during the power transfer period (S1440: YES), the power transmission device 10 sets "ON" to the movement history determination reference 174 of the determination reference information 170 (S1441). Then, the process proceeds to S1443.

On the other hand, in a case where it is determined that there is a case where the power receiving device 20 is not within the power transmission area of itself during the power transfer period (S1440: NO), the power transmission device 10 sets "OFF" to the movement history determination reference 174 of the determination reference information 170 (S1442). Then, the process proceeds to S1443.

In S1443, the power transmission device 10 determines whether or not the power transfer can be performed to the power receiving device 20 by itself based on the utilization rate r of the electric circuit 3 through which the power transmission device 10 itself receives power supply from the panel board 2. Specifically, the power transmission device 10 checks whether or not a current value flowing through the electric circuit 3 exceeds the maximum suppliable current value, in other words, checks whether or not the electric circuit 3 becomes overloaded when performing power transfer corresponding to the request-power P, and thereby determines whether or not it is possible to perform power transfer to the power receiving device 20 by itself. It should be noted that, as a current value to be used for the determination described above, which is needed for power transfer corresponding to the request-power P, for example, the value taking into consideration the transmission efficiency η and the tolerance α is used.

In a case where it is determined that the power transmission device 10 itself can perform power transfer to the power receiving device 20 (S1443: YES), the power transmission device 10 sets "ON" to the circuit utilization rate determination reference 175 of the determination reference information 170 (S1444). Then, the process proceeds to S1446.

On the other hand, in a case where it is determined that the power transmission device 10 itself cannot perform power transfer to the power receiving device 20 (S1443: NO), the power transmission device 10 sets "OFF" to the circuit utilization rate determination reference 175 of the determination reference information 170 (S1445). Then, the process proceeds to S1446.

In S1446, the power transmission device 10 transmits, to the power receiving device 20, determination reference information 170 whose content has been set in this way.

Referring back to FIG. 11, in S1015, the power receiving device 20 registers (appends), in the determination reference information management table 250, the determination reference information 170 that has been received during reception standby.

FIG. 15 shows an example of the determination reference information management table 250. As shown in the drawing, each time the determination reference information 170 is received from the power transmission device 10, the power receiving device 20 registers (appends) the received determination reference information 170 in the determination reference information management table 250.

Then, the power receiving device 20 selects the power transmission device 10 from which the power receiving device itself receives power supply based on the determination reference information management table 250 (S1016). Specifically, the power receiving device 20 selects a record in which "ON" is set the most, from the records in which the circuit utilization rate determination reference 175 is set with "ON" in the determination reference information 170 (records) registered in the determination reference information management table 250, and selects the power transmission device 10 corresponding to the power transmission device ID of this record as a power transmission device 10 from which the power receiving device itself receives power supply.

When selecting the power transmission device 10 from which the power receiving device itself receives power supply, the power receiving device 20 transmits a power transmission start request 160 (S1017).

FIG. 16 shows a data structure of a power transmission start request 160 transmitted by the power receiving device 20. As shown in the drawing, the power transmission start request 160 includes information corresponding to each item of a power receiving device ID 161 and a power transmission device ID 162. In these, the power receiving device ID 161 is set with the power receiving device ID of the power receiving device 20 that has transmitted the power transmission start request 160. Further, the power transmission device ID 162 is set with the power transmission device ID of the power transmission device 10 which has been selected in S1016.

When receiving the power transmission start request 160 from the power receiving device 20, the power transmission device 10 checks whether or not the power transmission device ID of itself has been set in the power transmission device ID 162 of the power transmission start request 160 (S1032). In a case where the power transmission device ID of itself has been set in the power transmission device ID 162 (S1032: YES), the power transmission device 10 starts power transfer to the power receiving device 20. After that, the process returns to S1021. On the other hand, in a case where a power transmission device ID other than that of itself is set in the power transmission device ID 162 (S1232: NO), the process returns to the process of S1021.

After starting power transfer, the power transmission device 10 monitors the reception of a power transmission end request from the power receiving device 20 in real time (S1034), and when receiving the power transmission end request (S1034: YES), the power transmission device 10 stops power transfer to the power receiving device 20. It should be noted that, for example, in a case where an operational input that ends the power transfer is performed to the input device 28 of the power receiving device 20, the power receiving device 20 transmits the power transmission end request.

As explained above, in the wireless power transfer system 1 of one or more embodiments, the power receiving device 20 selects the power transmission device 10 from which power supply is to be received based on the determination reference information 170 generated by each of the power transmission devices 10, thus the power receiving device 20 can select the power transmission device 10 suitable for itself to receive power supply therefrom based on the determination reference information 170.

Further, since the power transmission device 10 generates the determination reference information 170 based on the transmission efficiency η, the power receiving device 20 can select the power transmission device 10 suitable for itself to receive power supply therefrom based on the determination reference information 170. It should be noted that, since the power transmission device 10 acquires the accurate current position of the power receiving device 20 based on the positioning function and obtains the transmission efficiency η based on this, the power receiving device 20 can select the power transmission device 10 suitable for itself to receive power supply therefrom.

Further, the power transmission device 10 generates the determination reference information 170 with the determination reference generated by the power transmission device 10 based on the movement history of itself, thus the power receiving device 20 can select the power transmission device 10 suitable for itself to receive power supply therefrom based on the determination reference information 170.

Further, the power transmission device 10 generates the determination reference information 170 with the utilization rate r of the electric circuit from which the power transmission device 10 itself receives supply of drive power. Thus, the power receiving device 20 can select the power transmission device 10 suitable for itself to receive power supply therefrom based on the determination reference information 170.

Hereinabove, the embodiments of the present invention have been described. However, the above description is to facilitate understanding of the present invention and does not limit the present invention in any way. The present invention may be modified or altered without departing from the scope thereof, and of course the present invention includes its equivalents.

For example, in the above description, the positioning signal 600 is transmitted from the power receiving device 20, the power transmission device 10 receives the signal, and the positioning of the power receiving device 20 is performed on the power transmission device 10 side. However, on the contrary, it may be possible that the positioning signal 600 is transmitted from the power transmission device 10, the power receiving device 20 receives the signal, and the positioning is performed on the power receiving device 20 side.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 wireless power transfer system
10 power transmission device
14 position information providing device
20 power receiving device
170 determination reference information
171 power transmission device ID
172 request power determination reference
173 transmission efficiency determination reference
174 movement history determination reference
175 circuit utilization rate determination reference
181 power receiving device positioning section
182 movement history storing section
183 transmission efficiency calculation section
184 electric circuit utilization rate acquiring section
234 power transmission device selecting section
250 determination reference information management table

The invention claimed is:

1. A wireless power transfer system comprising:
a power receiving device; and
a plurality of power transmission devices that perform power transfer to the power receiving device, wherein
the power receiving device transmits request-power to the power transmission device, the request-power being power the power receiving device requests to be supplied with,
the power transmission device
when receiving the request-power from the power receiving device, generates determination reference information based on the received request-power, the determination reference information being information to be used as a determination reference when the power receiving device selects the power transmission device, and transmits the generated determination reference information to the power receiving device, the power receiving device receives the determination reference information, selects, based on the determination reference information, the power transmission device from which the power receiving device is to receive power supply, and transmits a power transmission start request to the selected power transmission device, and the power transmission device starts power transfer to the power receiving device when receiving the power transmission start request, wherein the system is communicably connected to a position information providing device that acquires a current position of the power receiving device, the power transmission device acquires a current position of the power receiving device from the position information providing device, obtains a distance from the power transmission device to the power receiving device based on the acquired current position, obtains transmission efficiency in transferring power to the power receiving device, the transmission efficiency corresponding to the obtained distance, generates the determination reference information based on the received request-power and the obtained transmission efficiency, and transmits the generated determination reference information to the power receiving device, and the position information providing device includes a plurality of antennas arranged adjacent to one another, the plurality of antennas receiving a positioning signal that is a wireless signal to be transmitted from the power receiving device, obtains a direction α where the power receiving device exists as seen from the position information providing device, based on a phase difference of the received positioning signals, and obtains a current position of the power receiving device based on the obtained direction.

2. The wireless power transfer system according to claim 1, wherein the power transmission device determines whether or not the transmission efficiency exceeds a predetermined threshold, and generates the determination reference information based on a result of the determination, the power receiving device selects the power transmission device based on the generated determination reference information.

3. The wireless power transfer system according to claim 1, wherein the power transmission device stores a movement history of the power receiving device based on the current position of the power receiving device which is acquired from the position information providing device, and generates the determination reference information based on the movement history, and the power receiving device selects the power transmission device based on the generated determination reference information.

4. A control method of a wireless power transfer system that includes a power receiving device and a plurality of power transmission devices performing power transfer to the power receiving device, the system being communicably connected to a position information providing device that acquires a current position of the power receiving device, the method comprising:

the power receiving device transmitting request-power to the power transmission device, the request-power being power the power receiving device requests to be supplied with, the power transmission device when receiving the request-power from the power receiving device, generating determination reference information based on the received request-power, the determination reference information being information to be used as a determination reference when the power receiving device selects the power transmission device, and transmitting the generated determination reference information to the power receiving device, the power receiving device receiving the determination reference information, selecting, based on the determination reference information, the power transmission device from which the power receiving device is to receive power supply, and transmitting a power transmission start request to the selected power transmission device, and the power transmission device starting power transfer to the power receiving device when receiving the power transmission start request, acquiring a current position of the power receiving device from the position information providing device, obtaining a distance from the power transmission device to the power receiving device based on the acquired current position, obtaining transmission efficiency in transferring power to the power receiving device, the transmission efficiency corresponding to the obtained distance, generating the determination reference information based on the received request-power and the obtained transmission efficiency, and transmitting the generated determination reference information to the power receiving device, and the position information providing device including a plurality of antennas arranged adjacent to one another, the plurality of antennas receiving a positioning signal that is a wireless signal to be transmitted from the power receiving device, obtaining a direction α where the power receiving device exists as seen from the position information providing device, based on a phase difference of the received positioning signals, and obtaining a current position of the power receiving device based on the obtained direction.

* * * * *